United States Patent [19]

Nozawa et al.

[11] Patent Number: 6,143,041
[45] Date of Patent: Nov. 7, 2000

[54] PROCESS FOR MANUFACTURING A BUTTON TYPE ALKALINE BATTERY

[75] Inventors: Mutsuo Nozawa; Koji Tanno; Kazuyuki Takahashi, all of Sendai; Morio Ishizaki, Itami, all of Japan

[73] Assignees: SII Micro Parts Ltd.; Ishizaki Press Ind. Co. Ltd., both of Japan

[21] Appl. No.: 08/860,128

[22] PCT Filed: Nov. 1, 1996

[86] PCT No.: PCT/JP96/03214

§ 371 Date: Sep. 12, 1997

§ 102(e) Date: Sep. 12, 1997

[87] PCT Pub. No.: WO97/16858

PCT Pub. Date: May 9, 1997

[30] Foreign Application Priority Data

Jan. 11, 1995 [JP] Japan .................................. 7-285342
Apr. 12, 1996 [JP] Japan .................................. 8-091468
Oct. 30, 1996 [JP] Japan .................................. 8-287852

[51] Int. Cl.$^7$ .................................................. H01M 2/04
[52] U.S. Cl. ..................................... 29/623.1; 429/206
[58] Field of Search .............................. 29/623.1; 429/206

[56] References Cited

U.S. PATENT DOCUMENTS 4,442,186  4/1984  Urry .
4,861,688  8/1989  Miura et al. ............................ 429/206
4,882,238  11/1989  Yoshioka et al. .

FOREIGN PATENT DOCUMENTS 3602485    1/1986  Germany .
3602485A1  7/1986  Germany .

*Primary Examiner*—John S. Maples
*Attorney, Agent, or Firm*—Adams & Wilks

[57] ABSTRACT

A method for manufacturing a button-type alkaline cell comprises forming and working a negative electrode having an inner surface of Cu using a die having a ceramic portion while abutting the ceramic portion of the die with at least the Cu inner surface of the negative electrode. The thus formed and worked negative electrode is then combined with a positive electrode compound, a negative electrode compound, a separator, a positive electrode, a gasket and an alkaline electrolyte to form the button-type alkaline cell.

19 Claims, 5 Drawing Sheets

STEP 1 — MANUFACTURING NEGATIVE ELECTRODE CAN COMPONENT

STEP 2 — COATING CERAMIC ON THE SURFACE OF THE CAN COMPONENT WHICH ABUTS WITH Cu SURFACE OF NEGATIVE ELECTRODE CAN

STEP 3 — ASSEMBLING AND ADJUSTING THE NEGATIVE ELECTRODE METALLIC MOLD

STEP 4 — MANUFACTURING NEGATIVE ELECTRODE CAN

STEP 5 — MANUFACTURING CELL BY COMBINING NEGATIVE ELECTRODE CAN MANUFACTURED IN STEP 4 WITH OTHER ELEMENTS

PROCESS FOR MANUFACTURING A BUTTON TYPE ALKALINE BATTERY

TECHNICAL FIELD

The present invention relates to an improvement of a manufacturing method of a button type alkaline cell. It is to provide a button type alkaline cell, having a good self-discharge characteristic, manufactured by combining a negative electrode can made from a raw material of steel on which Ni is provided at one surface thereof and Cu is provided at the other surface thereof and which is fabricated by using a die whose part abutting at least with the Cu surface is ceramics, with other components of the cell such as a positive electrode compound, a negative electrode compound, a separator, a positive electrode can, a gasket and an alkaline electrolyte. It is to provide, specifically, a button type alkaline cell containing a very little amount of mercury or no mercury at all and a manufacturing method thereof.

BACKGROUND ART

Hitherto, a button type alkaline cell is manufactured by fabricating a negative electrode can by using metallic molds such as a die, a punch and a blank holder made from tool steel, high speed steel or cemented carbide and by combining it with other components such as a positive electrode compound, a negative electrode compound, a separator, a positive electrode can, a gasket and a alkaline electrolyte.

As raw materials of the negative electrode can of the button type alkaline cell, an Ni—SUS—Cu clad material or a material in which Ni is plated on the side opposite from Cu which becomes the inner surface of the negative electrode can on a laminated material of Cu and SUS or Cu and a deep drawing steel is used. The negative electrode can is fabricated by working the raw material using a die made from tool steel or cemented carbide. The button type alkaline cell is manufactured by combining this negative electrode can with the other components such as the negative electrode compound mainly composed of zinc, the positive electrode compound mainly composed of silver oxide, the separator, the electrolyte, the positive electrode can and the gasket.

However, the button type alkaline cell using the negative electrode can manufactured by using the prior art die, in which tool steel or cemented carbide is used for the part which contacts with the Cu surface, generates gas from the Cu surface when the negative electrode zinc contacts with the alkaline electrolyte and when part of the electrolyte decomposes. It is because Fe of the tool steel, Co or Ni used as a binder of the cemented carbide or W which is the base material of the cemented carbide is transferred and adheres on the Cu surface, i.e. the inner surface of the negative electrode can, during working of the negative electrode can, though it is a very small amount. The generation of gas leads to the exhaustion of the negative electrode compound within the button type alkaline cell, thus deteriorating the self-discharge characteristic of the cell.

Although the gas may be suppressed from generating by containing mercury within the negative electrode compound because the degree of generation of gas may be reduced as the mercury covers the Cu surface, there is apprehension that the environment might be contaminated by the mercury contained within the disposed cells.

Although it has been attempted to reduce the amount of mercury by fully cleaning the negative electrode can or by adding indium and bismuth in order to reduce the amount of mercury contained within the button type alkaline cell and to maintain the effect of suppressing the generation of gas (e.g. Japanese Patent Laid-Open Nos. Hei. 8-31428, Hei. 8-130021 and others), it is difficult to prevent the gas from generating from the inner surface of the negative electrode can.

SUMMARY OF THE INVENTION

Then, according to the present invention, a negative electrode can having an inner surface of Cu is formed and worked by a die whose part abutting at least with the Cu surface is ceramic. More preferably, the negative electrode can is worked by using a die coated with ceramic. While there is a number of types of ceramics which can be used as the coating for the die, zirconium oxide, silicon boride, or silicon nitride having a good impact resistance is desirable in particular.

According to the present invention, in manufacturing a button type alkaline cell having a negative electrode compound of zinc containing a small amount of mercury or no mercury at all, the negative electrode can having the inner surface of Cu is formed and worked by a die whose part abutting at least with the Cu surface is ceramic. It is preferable to provide a reinforcing portion because ceramic is normally weak to a bending load. The reinforcement is made by providing a raw material such as tool steel and cemented carbide on the surface opposite from the surface of the ceramic to which the load is applied. It is possible to realize a structure in which the ceramic is provided at the part of the die contacting with the Cu surface of the negative electrode can and the reinforcing portion is provided on the opposite side from the portion of the ceramic to which the load is applied by using a die in which ceramic is coated on the surface of cemented carbide or steel.

No Fe is transferred from the steel and no Co, Ni or W is transferred from the cemented carbide when the negative electrode can formed and worked by such die is used. For the ceramics to be used, zirconium oxide, silicon boride, and silicon nitride are excellent in terms of abrasion resistance, impact resistance and chemical resistance.

Accordingly, an amount of gas generated when the negative electrode can of the present invention contacts with the negative electrode compound and alkaline electrolyte is reduced considerably as compared to the prior art case. The effect of reducing the generation of gas is remarkable when negative electrode zinc containing a little amount of mercury or no mercury at all is used.

DETAILED DESCRIPTION OF THE PREFERRED EMBODIMENTS

Preferred embodiments of the present invention will be explained below.

First Embodiment

Figure 2:
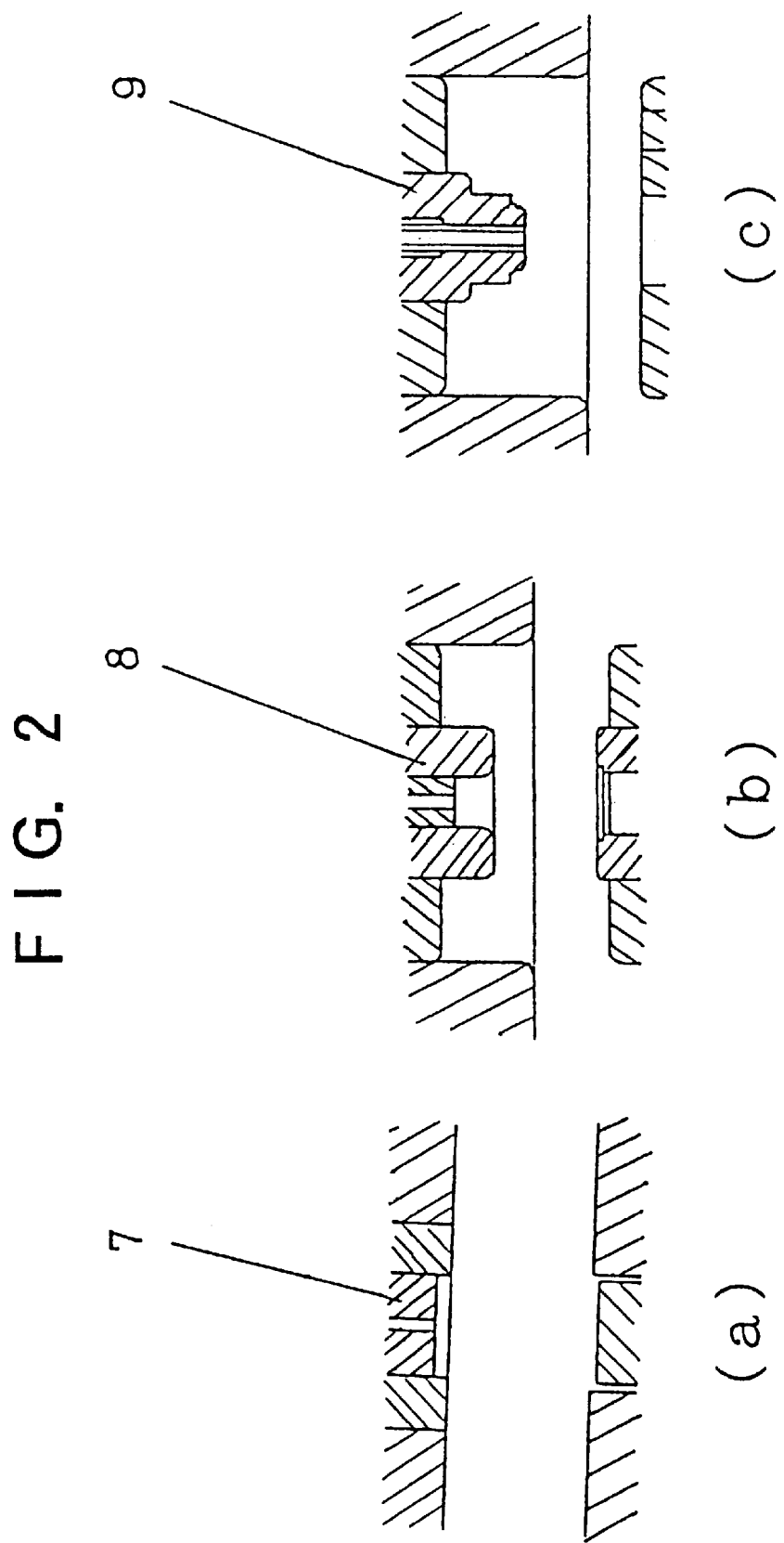
FIGS. 2a through 2c are section views of a main part of one exemplary die for manufacturing a negative electrode can of the button type alkaline cell of the present invention.
Figure 3:
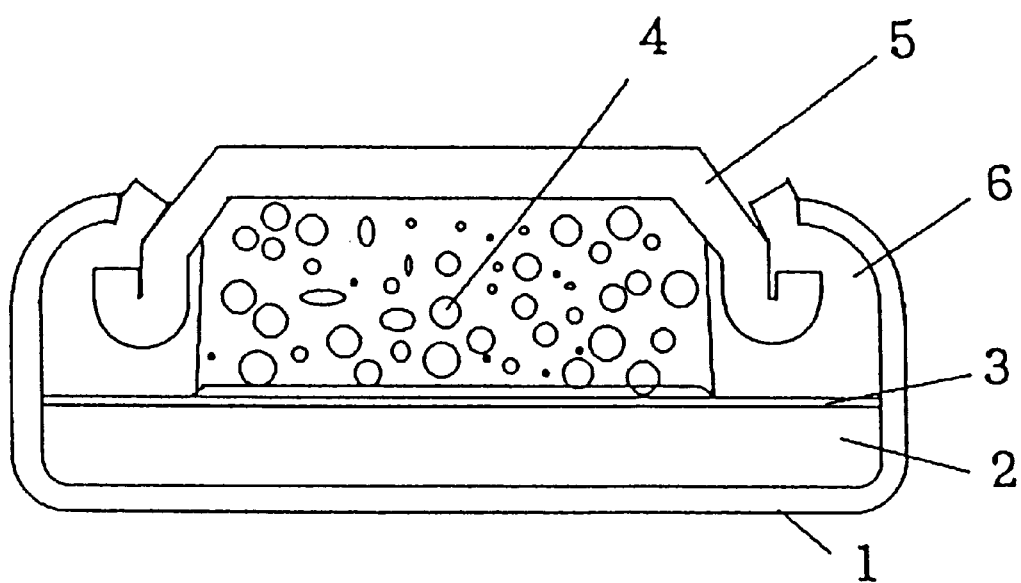
FIG. 3 is a section view of the button type alkaline cell according to a preferred embodiment of the present invention.

FIG. 3 is a section view of a silver oxide cell SR512SW which is one example of a button type alkaline cell of the present invention, and FIGS. 2a through 2c are section views showing the main part of a die used in manufacturing a negative electrode can of the silver oxide cell SR512SW in FIG. 3.

Parts of the die are manufactured first and a ceramic coating mainly composed of zirconium oxide is applied to parts 7, 8 and 9 among the parts of the die in FIGS. 2a through 2c which abut with a Cu surface of the negative electrode can. They are then assembled and adjusted as the die. The negative electrode can 5 is manufactured by using the die and by using Ni—SUS—Cu as its raw material.

Figure 1:
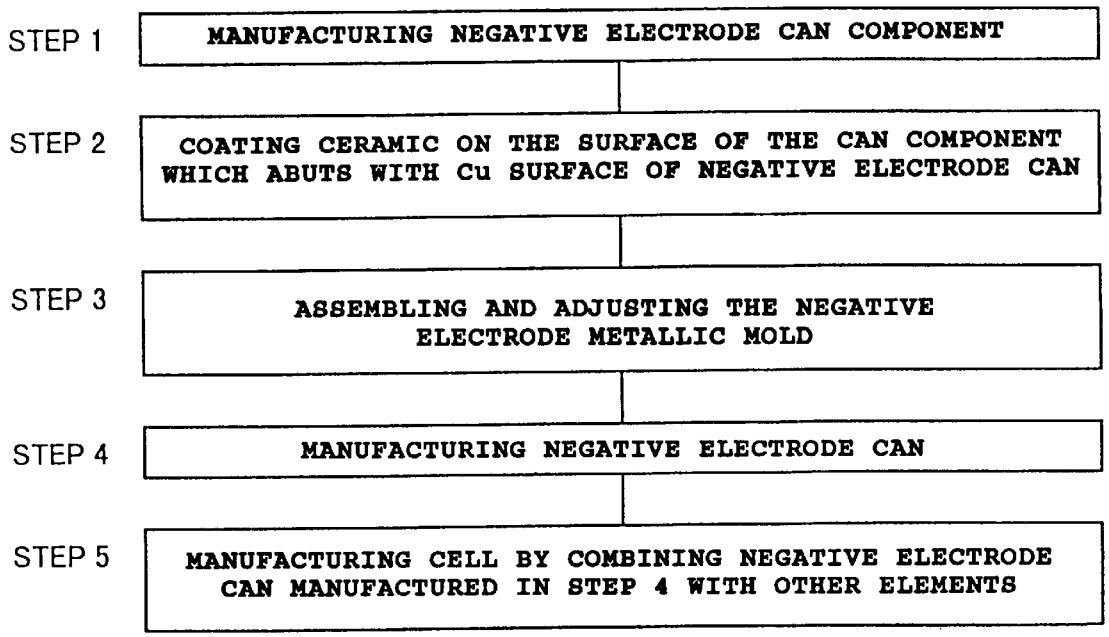
FIG. 1 is a flow diagram showing manufacturing steps of a button type alkaline cell of the present invention.

Next, a positive electrode compound 2 is poured into a positive electrode can 1, a separator 3 is placed on the positive electrode can, a gasket 6 is inserted and an electrolyte composed of a negative electrode compound 4 and NaOH is injected to the gasket. Then, after covering it with the lid of the negative electrode can 5, an opening of the negative electrode can 1 is caulked to seal it. FIG. 1 shows its process.

Two kinds of silver oxide cells SR512SW, one containing and the other not containing mercury in the negative electrode zinc, were manufactured as the inventive and prior art cells, respectively. Table 1 shows values of the degree of self-discharge thereof measured from discharge capacity in the early period from the production and from that after keeping them for 20 days in an environment of 60° C. The measurements were calculated from an average of six each.

TABLE 1

|  | Containing Hg in Negative Electrode Can | Containing No Hg in Negative Electrode Can |
| --- | --- | --- |
| Present Invention | 0.8% | 1.4% |
| Prior Art | 3.1% | 4.8% |

Second Embodiment

Another embodiment of the present invention will be explained below.

Figure 4:
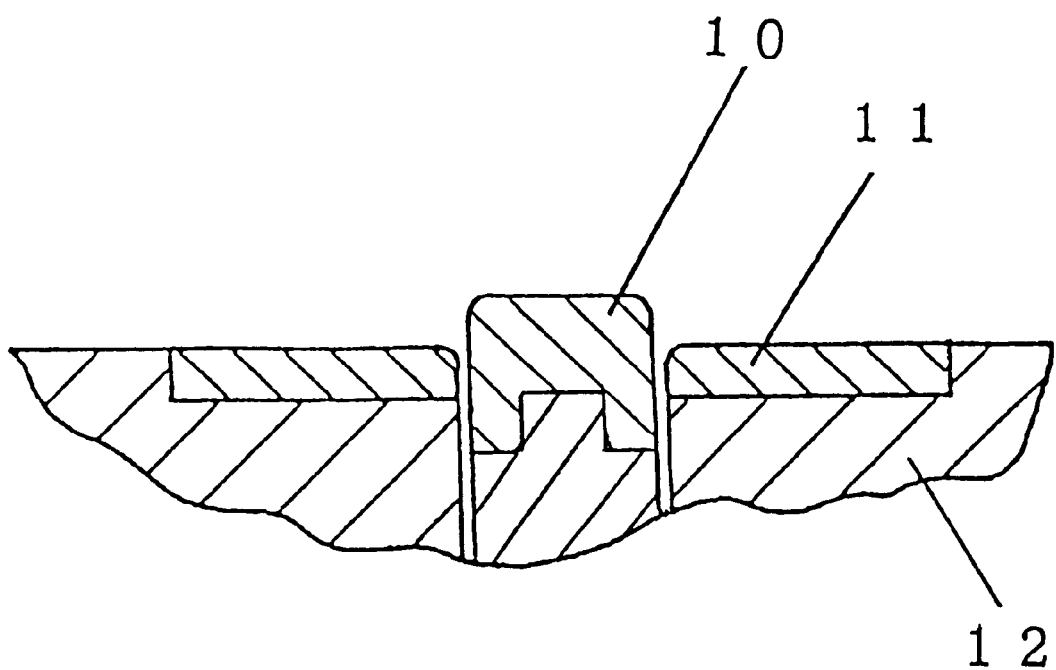
FIG. 4 is a section view showing an example of a punch portion and a wrinkle pressing portion of a die for the negative electrode can made from ceramics reinforced by tool steel.
Figure 5:
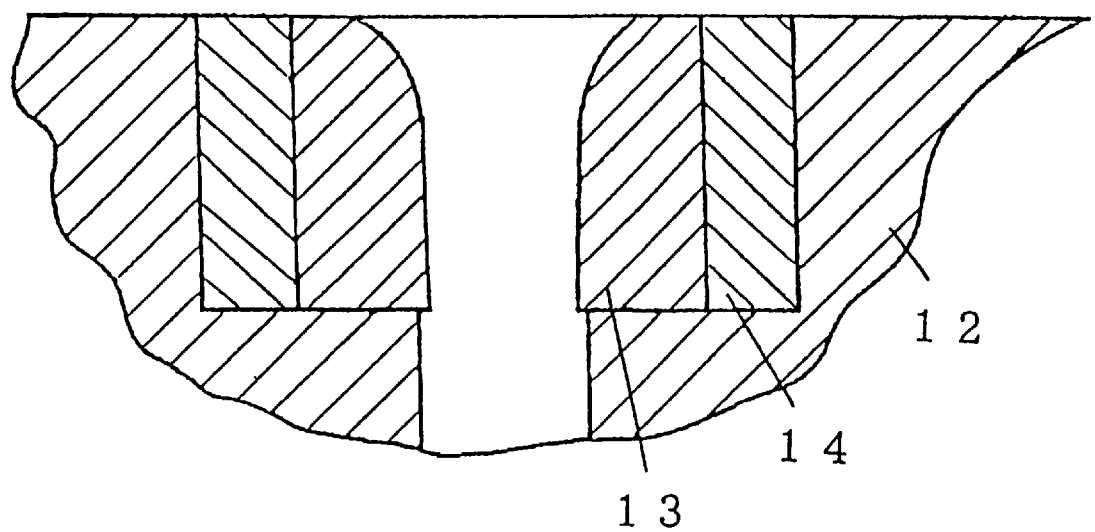
FIG. 5 is a partial section view showing an exemplary ceramic die reinforced by cemented carbide.

A type of cell is silver oxide cell SR626SW whose sectional profile is the same with that shown in FIG. 3. FIG. 4 is a section view of the main part of a die used in manufacturing a negative electrode can of the present embodiment. FIG. 5 is a section view of a die for bending a turn-up portion at the periphery of the negative electrode can. It is constructed such that a cemented carbide ring is embedded as a reinforcing portion into a holding portion made from tool steel so as to hold the ceramic die therein. The ceramics in FIGS. 4 and 5 are zirconium oxide. The negative electrode can is manufactured by trimming a disc of required size from a stripe of Ni—SUS—Cu clad, i.e. the raw material, by creating a cavity by a punch shown in FIG. 4 and by bending the periphery by the die shown in FIG. 5. After fabricating the negative electrode can 5, the positive electrode compound 2 is poured into the positive electrode can 1, the separator 3 is placed on the positive electrode can, the gasket 6 is inserted and the electrolyte composed of negative electrode compound 4 and NaOH is injected into the gasket. Then, after covering it by the lid of the negative electrode can 5, the opening of the negative electrode can 1 is caulked to seal it.

Two kinds of cells, one containing and the other not containing mercury in the negative electrode zinc were manufactured as the inventive and prior art cells, respectively. Table 2 shows values of degree of self-discharge thereof measured from discharge capacity in the early period from the production and from that after keeping them for 40 days in an environment of 60° C. The measurements were calculated from an average of six each.

TABLE 2

|  | Containing Hg in Negative Electrode Can | Containing No Hg in Negative Electrode Can |
| --- | --- | --- |
| Present Invention | 1.8% | 8.2% |
| Prior Art | 6.5% | 13.4% |

It is apparent from these results that the present invention is effective in improving the self-discharge characteristic of all the cells such as a silver oxide cell, an alkali-manganese cell, an air-zinc cell and others having the Cu surface inside and containing the negative electrode compound mainly composed of zinc and the alkaline electrolyte. Further, because these effects are brought about with respect to working of the Cu surface, it is apparent that the present invention is effective also to any raw material so long as it is a raw material in which Cu is laminated with steel.

It is noted that although 5% to 10% of mercury is contained in the negative electrode zinc in general, it is needless to say that the present invention is effective also when the purity of the zinc is high or when the content of mercury is lower than that.

Thus, the present invention is very effective in manufacturing the button type alkaline cell containing a very little amount of mercury or no mercury at all in particular and having a good self-discharge characteristic by combining the negative electrode can made from steel provided with Cu as a raw material and fabricated by using the die whose part abutting at least with the Cu surface is ceramics or is coated with ceramics, with other components of the cell, such as the positive electrode compound, negative electrode compound, the separator, positive electrode can, gasket, alkaline electrolyte and others.

We claim:

1. A method for manufacturing a button-type alkaline cell, comprising the steps of:

forming and working a negative electrode can having an inner surface of Cu using a die having a ceramic portion while abutting the ceramic portion of the die with at least the Cu inner surface of the negative electrode can; and combining the negative electrode can with a positive electrode compound, a negative electrode compound, a separator, a positive electrode can, a gasket and an alkaline electrolyte to form the button-type alkaline cell.

2. A method for manufacturing a button-type alkaline cell according to claim 1; wherein the die has a reinforcing portion at a side opposite to the ceramic portion for reinforcing the ceramic portion to which a load is applied during the steps of forming and working the negative electrode can.

3. A method for manufacturing a button-type cell according to claim 2; wherein the reinforcing portion comprises cemented carbide or tool steel.

4. A method for manufacturing a button-type cell according to claim 2; wherein the ceramic portion comprises a material selected from the group consisting of zirconium oxide, silicon boride and silicon nitride.

5. A method for manufacturing a button-type cell according to claim 2; wherein the step of forming and working the negative electrode can comprises forming and working a main body composed of a laminated metallic material, disposing Ni on a first surface of the main body, and disposing Cu on a second surface of the main body opposite the first surface.

6. A method for manufacturing a button-type alkaline cell according to claim 1; wherein the die has a reinforcing portion, and wherein the ceramic portion comprises a ceramic material coated on a surface of the reinforcing portion.

7. A method for manufacturing a button-type cell according to claim 6; wherein the ceramic portion comprises a material selected from the group consisting of zirconium oxide, silicon boride and silicon nitride.

8. A method for manufacturing a button-type cell according to claim 6; wherein the step of forming and working the negative electrode can comprises forming and working a main body composed of a laminated metallic material, disposing Ni on a first surface of the main body, and disposing Cu on a second surface of the main body opposite the first surface.

9. A method for manufacturing a button-type alkaline cell according to claim 6; wherein the reinforcing portion comprises cemented carbide or tool steel.

10. A method for manufacturing a button-type cell according to claim 9; wherein the step of forming and working the negative electrode can comprises forming and working a main body composed of a laminated metallic material, disposing Ni on a first surface of the main body, and disposing Cu on a second surface of the main body opposite the first surface.

11. A method for manufacturing a button-type alkaline cell according to claim 9; wherein the ceramic portion comprises a material selected from the group consisting of zirconium oxide, silicon boride and silicon nitride.

12. A method for manufacturing a button-type alkaline cell according to claim 11; wherein the step of forming and working the negative electrode can comprises forming and working a main body composed of a laminated metallic material, disposing Ni on a first surface of the main body, and disposing Cu on a second surface of the main body opposite the first surface.

13. A method for manufacturing a button-type alkaline cell according to claim 12; wherein the laminated metallic material comprises a clad of Ni—SUS—Cu.

14. A method for manufacturing a button-type alkaline cell according to claim 12; wherein the laminated metallic material comprises Ni plated on a clad of SUS—Cu or a clad of Cu and deep drawing steel.

15. A method for manufacturing a button-type alkaline cell according to claim 14; wherein the negative electrode compound does not contain mercury.

16. A method for manufacturing a button-type cell according to claim 12; wherein the laminated metallic material comprises steel.

17. A method for manufacturing a button-type cell according to claim 1; wherein the ceramic portion comprises a material selected from the group consisting of zirconium oxide, silicon boride and silicon nitride.

18. A method for manufacturing a button-type cell according to claim 1; wherein the step of forming and working the negative electrode can comprises forming and working a main body composed of a laminated metallic material, disposing Ni on a first surface of the main body, and disposing Cu on a second surface of the main body opposite the first surface.

19. A method for manufacturing a button-type alkaline cell according to claim 1; wherein the negative electrode compound does not contain mercury.

* * * * *